Dec. 25, 1928.  
S. ALEXANDER  
SCRAPER  
Filed June 30, 1928  
1,696,561
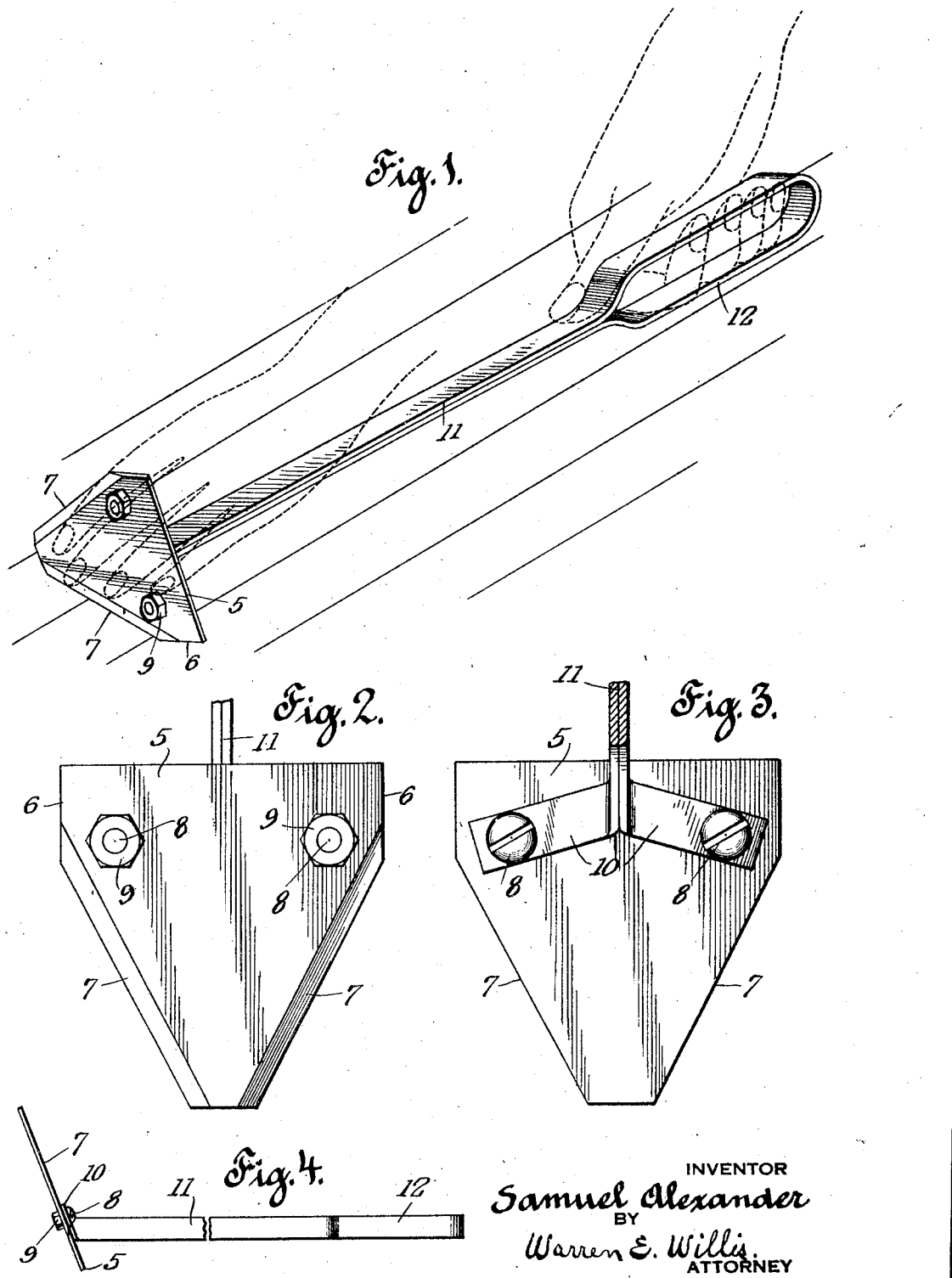
INVENTOR  
Samuel Alexander  
BY  
Warren E. Willis  
ATTORNEY Patented Dec. 25, 1928.

1,696,561

UNITED STATES PATENT OFFICE.

SAMUEL ALEXANDER, OF NEW YORK, N. Y.

SCRAPER.

Application filed June 30, 1928. Serial No. 289,353.

This invention relates to scrapers and more particularly to devices for scraping floors and other flat surfaces.

Heretofore, scraping devices of the type herein under consideration have been inconvenient and inefficient in that they have not been properly designed to provide the proper scraping angle and are not sufficiently resilient.

It is an object of this invention to provide a scraping device which is equipped with a resilient handle connected to a scraping blade at an angle which enables convenient and efficient manipulation of the device.

A further object of the invention is to provide a scraping device in which the scraping blade has angular or convergent cutting edges, similar to the cutting blade of a power mowing machine.

These and other objects are attained by the novel construction, combination and arrangement of parts, hereinafter described and shown in the accompanying drawing, constituting a material part of this disclosure, and in which:—

Figure 1 is a perspective view showing the manner in which the scraping device is used.

Figure 2 is a front view of the scraping blade.

Figure 3 is a rear view of the scraping blade showing the manner in which the resilient handle is attached thereto.

Figure 4 is a side view of the device showing the inclination of the blade to the handle.

Referring to the drawings, the scraping device is shown to comprise a blade 5 having short parallel side portions 6 and inclined bevelled scraping edges 7. By means of bolts 8 and nuts 9, the blade 5 is connected to the arms 10 of the resilient handle 11.

The handle 11 consists of a flat strip of metal bent upon itself and looped at one end to form a hand grip 12, and flared at its free ends to provide the arms 10, which, as will be seen from Figure 4, are bent at an angle to the longitudinal axis of the handle 11, so that the bade 5 will be inclined in a similar manner to the handle 11.

A cutting blade of a power mowing machine is preferably used for the scraping blade 5, thus enabling the use of a standard article of high quality steel, provided with the required perforations for the bolts, thus facilitating the manufacture and assembly of the device.

The manner in which the handle is formed provides the necessary resiliency, for it will be seen that there is no fastening means at the point where the arms 10 flare from the straight portion of the handle. This causes a spreading of the arms when pressure is applied to the handle.

In use, an operator grasps the hand grip 12 with one hand and the blade 5 with the other hand and pulls the device towards or shoves it away from himself, as he may prefer. In the event that a snag or rough place is encountered in the scraping operation, the resiliency of the handle compensates for the sudden excess pressure and prevents undesirable tears and deep cuts in the surface being scraped, while the effect of the hand upon the blade prevents chattering of the tool.

From the above description it will be seen that a highly desirable convenient and efficient scraping device has been provided which at the same time may be readily and cheaply manufactured.

The foregoing disclosure is to be regarded as descriptive and illustrative only and not as restrictive or limitative of the invention, of which obviously an embodiment may be constructed, including many modifications, without departing from the general scope herein indicated and denoted in the appended claim.

Having thus described my invention, what I claim as new and desire to secure by Letters Patent, is:—

A scraping device comprising a scraping blade having two cutting edges inclined towards each other, a handle formed from a flat strip of metal bent upon itself and looped at one end to form a hand grip, the free ends of the strip being bent outwardly and twisted, and means for attaching the blade to the arms so that the plane of the blade will be inclined to the axis of the handle with the plane of the metal strips forming the handle bisecting the angle between the cutting edges.

In testimony whereof I affix my signature.

SAMUEL ALEXANDER.